No. 773,426. PATENTED OCT. 25, 1904.
C. L. ROSENQVIST.
VARIABLE SPEED AND POWER TRANSMISSION DEVICE.
APPLICATION FILED JULY 29, 1903.
NO MODEL. 2 SHEETS—SHEET 1.

WITNESSES:
Edward Thorpe
E. E. Ellis

INVENTOR
Conrad L. Rosenqvist
BY Munn & Co
ATTORNEYS

No. 773,426. PATENTED OCT. 25, 1904.
C. L. ROSENQVIST.
VARIABLE SPEED AND POWER TRANSMISSION DEVICE.
APPLICATION FILED JULY 29, 1903.
NO MODEL. 2 SHEETS—SHEET 2.
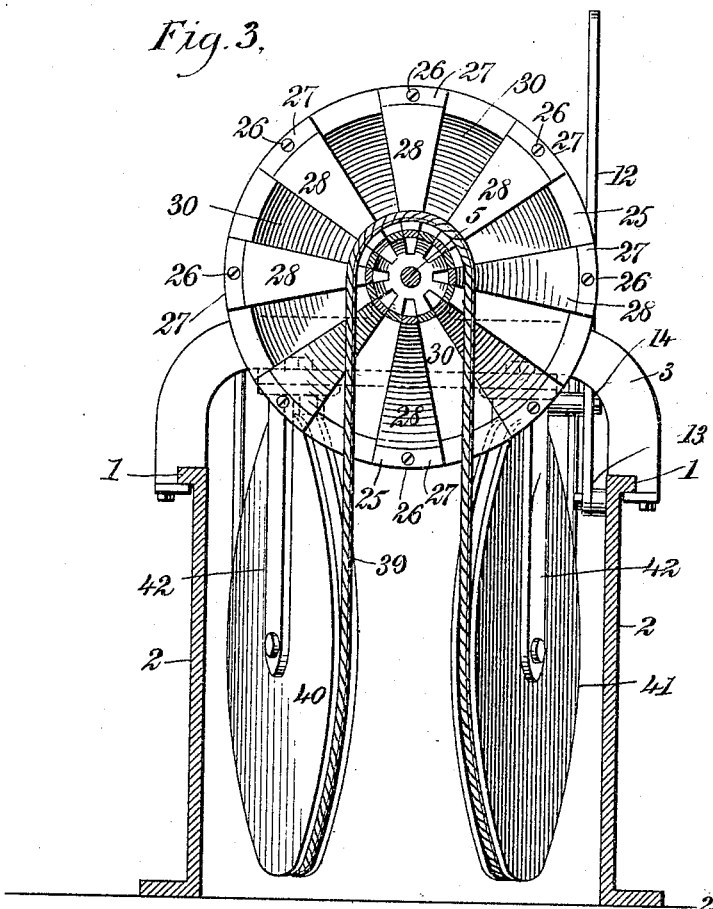
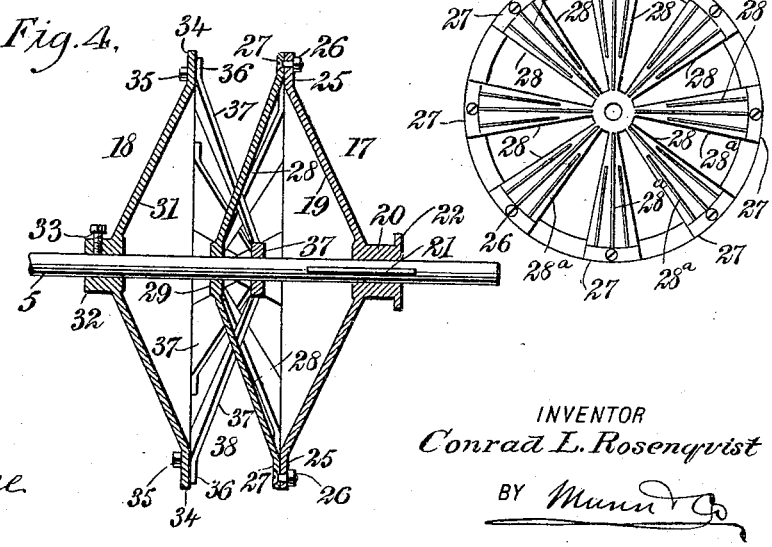
WITNESSES:
Edward Thorpe
E. E. Ellis
INVENTOR
Conrad L. Rosenqvist
BY Munn & Co
ATTORNEYS No. 773,426.                                           Patented October 25, 1904.

UNITED STATES PATENT OFFICE.

CONRAD L. ROSENQVIST, OF NIAGARA FALLS, NEW YORK.

VARIABLE SPEED AND POWER TRANSMISSION DEVICE.

SPECIFICATION forming part of Letters Patent No. 773,426, dated October 25, 1904.

Application filed July 29, 1903. Serial No. 167,413. (No model.)

*To all whom it may concern:*

Be it known that I, CONRAD L. ROSENQVIST, a subject of the King of Sweden and Norway, and a resident of Niagara Falls, in the county of Niagara and State of New York, have invented a new and Improved Variable Speed and Power Transmission Device, of which the following is a full, clear, and exact description.

In the transmission of motion and power from a prime mover to a machine or the like which is subjected to considerable variations in load strain it is very essential that effective means be provided whereby compensation is afforded for such variations of the load by altering the speed of motion correspondingly, also that slip of the transmitting medium be avoided and that the changes in speed be effected either quickly or gradually, as desired, while the driver and driven machine are in motion.

The object of my invention is to provide novel details of construction for a device embodying the advantageous characteristics indicated which afford a very simple practical speed-changer that is effective and reliable in operation and that consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1:
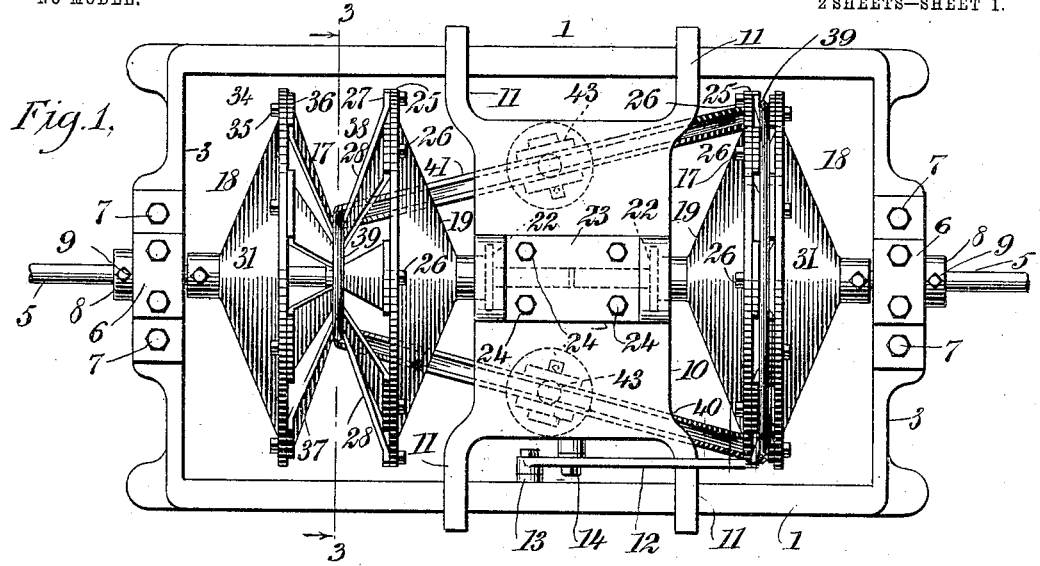
Figure 2:
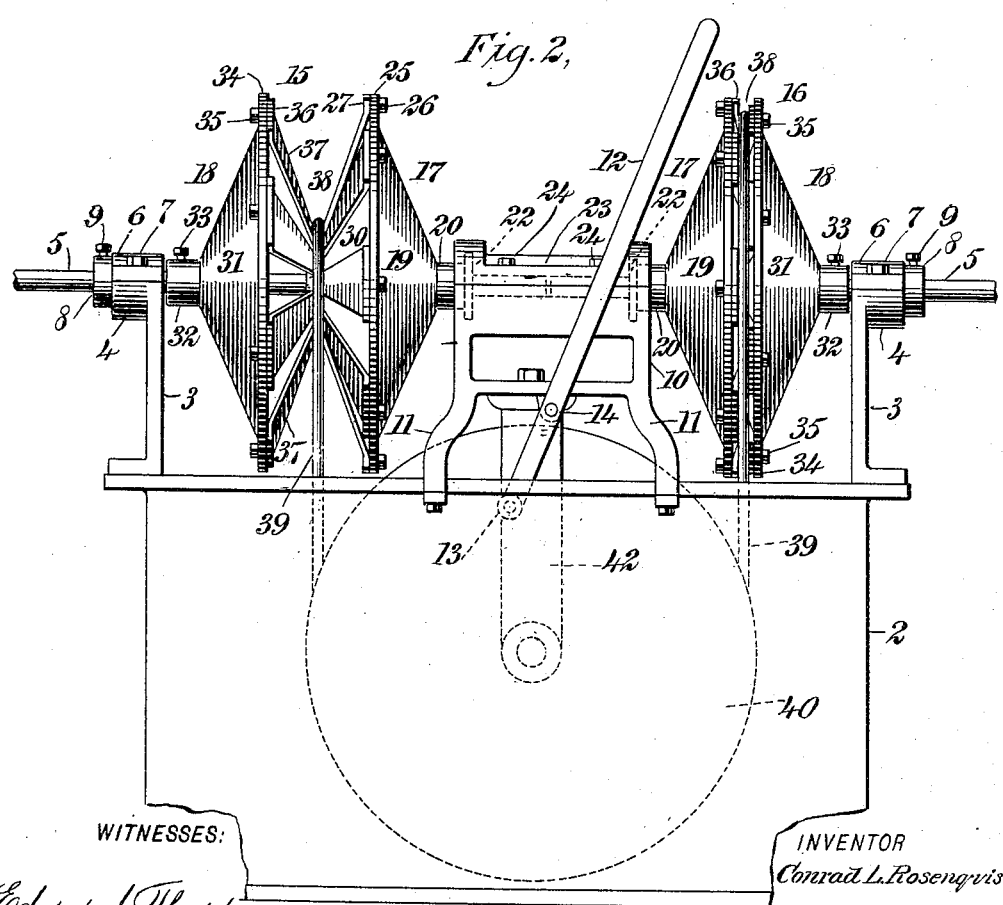

Figure 1 is a top plan view of a variable-speed device embodying my improvements. Fig. 2 is a side view thereof. Fig. 3 is a vertical transverse sectional view on the line 3 3 of Fig. 1. Fig. 4 is a longitudinal sectional view in detail, showing more clearly the construction of the coöperating sections of each of the pulleys employed; and Fig. 5 is a side view of a half-section of one of the speed-varying pulleys, showing a different construction for its working face.

Before proceeding with a more detailed description it may be stated that in the form of my improvements herein shown I preferably employ two shafts supported coincidentally with each other and on each of which is mounted a motion-transmitting pulley of special construction, said pulleys each comprising a stationary section and a longitudinally-movable section, the two sections being provided with interengaging members coöperating with each other in the production of a circumferential groove, the adjustments of said movable sections of the pulleys effecting variation of the relations of said interengaging members, thereby causing a corresponding variation in the motion-transmitting capacity of the pulleys, as will hereinafter be clearly explained, and while I have herein represented my improvements in a certain preferred embodiment it will be understood, of course, that I am not limited to the precise details thereof in practice, since immaterial changes therein may be resorted to coming within the scope of my invention.

Specific reference being had to the drawings by the designating characters marked thereon, 1 represents a stationary frame, which, if desired, may be supported at any suitable elevation or height by means of the uprights 2 and which, as herein shown, is preferably provided with arched connecting members 3, at or near the ends thereof, said members being formed or provided with outer bearings 4 for practically duplicate shafts and each bearing having a removable top section 6, secured in place by bolts 7 or otherwise, the shafts each being provided with outer removable collars 8 to limit the inner endwise or longitudinal movements thereof, said collars being adjustably secured upon the shafts in any suitable way, as by means of set-screws 9.

The inner ends of the shafts 5 may be supported in any suitable manner, as by means of a frame 10, preferably having legs 11 mounted upon the longer portions of the frame 1, this frame 10 being adjustable longitudinally on the said frame 1 in either direction by means of an operating hand-lever 12, movably connected to the frame 1 at 13 and to the said movable frame at 14, so that by throwing said lever in one direction or the other the movable frame will be operated accordingly, as will be apparent. Mounted upon the said shafts 5, intermediate of the bearings 4 and the ends of the said movable frame 10, are the motion-transmitting pulleys 15 and 16, each practically a duplicate of the other and comprising plural sections 17 and 18, as shown. The said section 17 of each of said pulleys is constructed of practically a conical disk or plate 19, (see Fig. 4,) having rigid therewith at the apex a bearing 20, which is keyed at 21 to its shaft, so as to be capable of a slidable movement thereon, said bearing being provided with a collar or flange 22 at the end thereof, which is partially received in a recess formed therefor in the adjacent end of the longitudinally-movable frame 10, said collars being clamped to said frame by means of a detachable top plate 23, secured in place by bolts 24 or otherwise and also thus completing the bearings for the inner ends of the shafts, as shown. The edge of said section 17 is flanged or turned outwardly at 25, and fitted to said flange, by means of bolts 26 or otherwise, are the flanges 27 of a series of arms 28, reversely inclined to the disk 19 and radiating from a common hub or ring 29, movable on the shaft, it being noted that said arms are each of gradually-increasing width toward their outer ends, thus forming gradually-widening spaces 30 between the edges thereof. The said section 18 of each of the pulleys 15 and 16 is constructed also of practically a conical disk or plate 31, reversely disposed to the conical disk or plate 19 and having at its apex a hub 32, which is secured to the shaft 5 in any desired manner, as by means of a set-screw 33 said disk 19, also having at its outer edge a flange 34, to which is secured at 35 the flanges 36 at the outer ends of a series of reversely-disposed arms 37, passing through the spaces 30 between the arms 28 and being rigid with a hub 37, which is thus maintained rigid with the shaft 5, as is apparent. In this way it will be seen that the reversely-inclined radiating arms of the two sections of each pulley are interengaged with each other about the axes of the shafts in such manner as to form between them an annular V-shaped groove 38, the relation of the bases and sides of which may be varied with the sliding adjustments imparted to the movable pulley-sections through manipulation of the devices already described, and consequently the motion-transmitting capacity of the pulleys will be varied accordingly, as will be readily understood.

I have herein represented the two pulleys 15 and 16 each constructed and operating as set forth, and it will be noted that when the movable section of one of said pulleys is operated in either direction the movable section of the other pulley is also operated reversely; but it will be understood, of course, that my invention comprehends a single pulley only, constructed and operating substantially as herein indicated, by which the speed of any device driven therefrom may be altered or varied at will.

In Fig. 5 each of the arms 28 is shown as provided with projecting ribs 28$^a$, that are spaced apart and extend longitudinally thereon, thus providing a practically-corrugated surface on each arm which will bite upon a belt, of rope or other flexible material, that is drawn into the V-shaped channel before mentioned, and it is to be understood that similar ribs are formed on each of the arms 37, which interengage with the arms 28.

As a convenient illustration of the operation of my improvements I have represented the pulley 16 as connecting with the pulley 15 by means of a motion-transmitting belt 39, passing over guide-pulleys 40 and 41, supported by hangers 42, secured at 43 to the movable frame 10, it being readily apparent that either one of said pulleys (and its shaft) may thus be driven the one from the other at a speed which may be varied. If desired, I may also employ set-screws (not shown) for securing the hubs of the movable sections of the pulleys to the shafts at different points of adjustment; but this is not essential. The belt 39 may be formed of leather or other material twisted or plaited to give it slight projections, which will better adapt it to receive and transmit motion without slipping.

It will be seen that by employing the mechanism hereinbefore described the motion received from any suitable source at an approximately constant speed and power may by the use of a suitable flexible connection, as before explained, be transmitted to the second shaft without slip, and the relative speed of this driven shaft can be varied, as occasion may require, while the device is in motion.

Having thus described my invention, I claim as new and desire to secure by Letters Patent—

1. In a variable-speed device, a pulley constructed of a relatively stationary section and a sliding section, each section consisting of a conical disk having a bearing at its apex and a marginal flange, and a series of tapering spaced arms reversely inclined to the disk, and provided with a bearing at their inner ends and with a marginal flange secured to the flange of the disk, the arms of one section extending between the arms of the other section.

2. A variable-speed device, comprising alined shafts, stationary outer bearings therefor, a slidable frame supporting inner bearings for said shafts, and duplicate pulleys on the shafts, each constructed of a relatively stationary section, and a movable section, forming between them an annular groove for a belt, said sections each including a series of radial arms, with the arms of the two sections interengaging with each other, and the movable sections being connected to the frame, a belt passing from the groove of one pulley to the groove of the other pulley, and means for shifting said slidable frame.

3. A variable-speed device, comprising alined shafts, stationary outer bearings therefor, a slidable frame supporting inner bearings for said shafts, and duplicate pulleys on the shafts, each constructed of a relatively stationary section, and a movable section, forming between them an annular groove for a belt, said sections each including a series of radial arms, with the arms of the two sections interengaging with each other, and the movable sections being connected to the frame, a belt passing from the groove of one pulley to the groove of the other, and a pivoted lever for shifting said slidable frame.

4. A variable-speed device, comprising alined shafts, stationary outer bearings for the shafts, a sliding frame in which the inner ends of the shafts are mounted, a pulley on each shaft, each pulley consisting of a relatively stationary section and a movable section connected with the sliding frame, the sections having interengaging arms, and means for shifting the said frame.

5. A variable-speed device, comprising a driving-shaft and a driven shaft, both in axial alinement with one another, stationary outer bearings therefor, a slidable frame supporting inner bearings for said shafts, and duplicate pulleys on the shafts, each constructed of a relatively stationary section, and a movable section, forming between them an annular groove for a belt, said sections each including a series of radial arms, with the arms of the two sections interengaging with each other, and the position of the movable sections being controlled by the inner bearings supported on the slidable frame, a belt passing from the groove of one pulley around guide-pulleys supported from the slidable frame, and in parallelism back to the groove of the other pulley, and a pivoted lever for shifting said slidable frame.

In testimony whereof I have signed my name to this specification in the presence of two subscribing witnesses.

CONRAD L. ROSENQVIST.

Witnesses:
WILLIAM M. HARRIGAN,
MARY G. DEIGHTON.